June 14, 1955  E. G. FORSSELL  2,710,749
FRICTION SHOCK ABSORBING MECHANISM
Filed Aug. 16, 1952  2 Sheets-Sheet 1
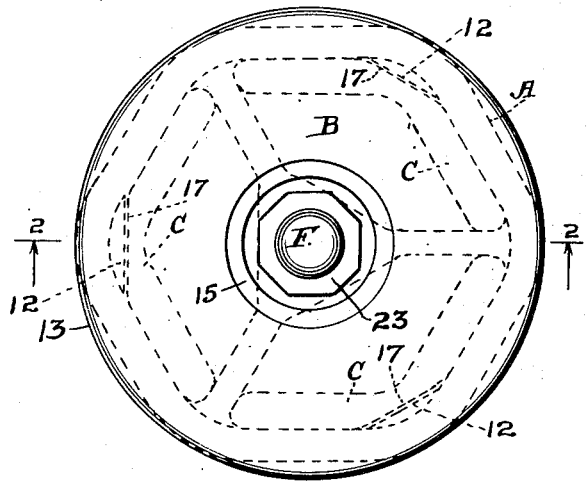
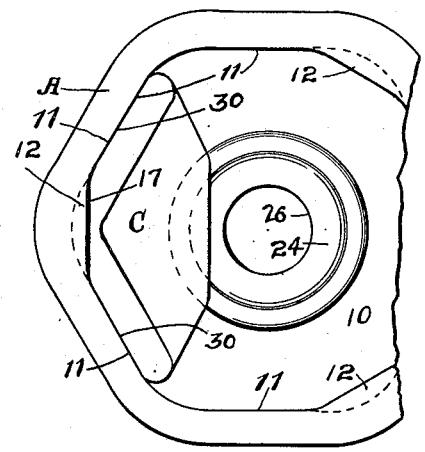
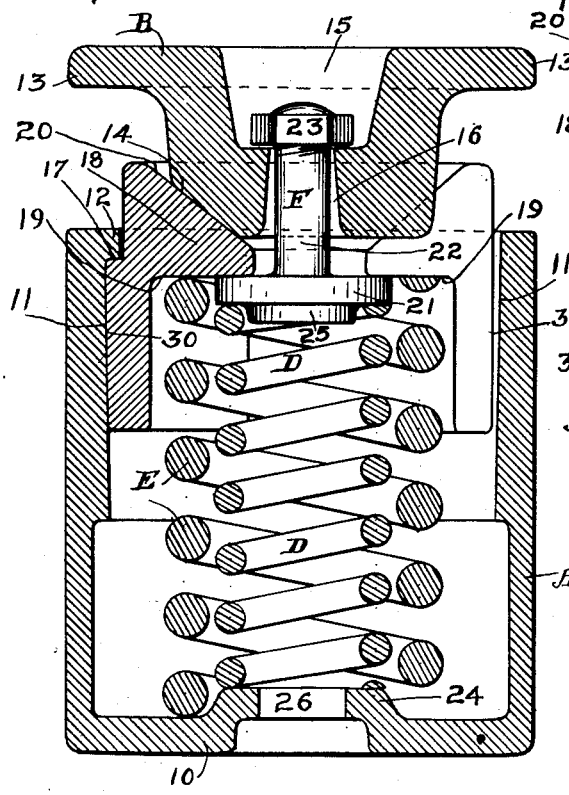
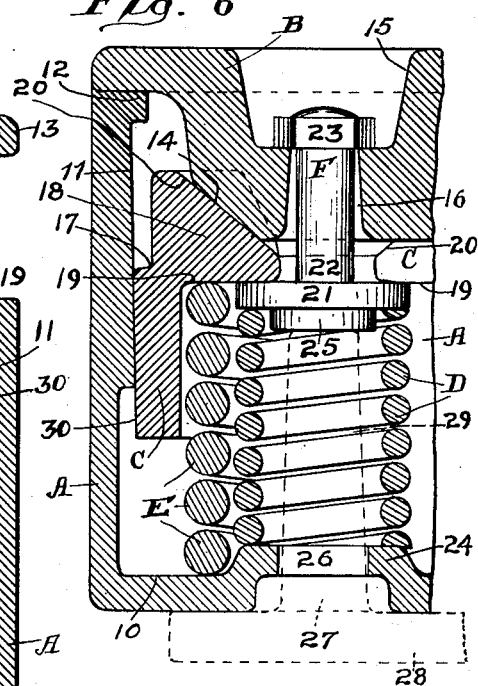
Inventor:
Eric G. Forssell.
By Henry Fuchs
Attys.

June 14, 1955     E. G. FORSSELL     2,710,749
FRICTION SHOCK ABSORBING MECHANISM
Filed Aug. 16, 1952     2 Sheets-Sheet 2

Inventor:
Eric G. Forssell.
By Henry Fuchs
Atty.

United States Patent Office 2,710,749
Patented June 14, 1955

2,710,749
FRICTION SHOCK ABSORBING MECHANISM

Eric G. Forssell, Kenmore, N. Y., assignor to W. H. Miner, Inc., Chicago, Ill., a corporation of Delaware Application August 16, 1952, Serial No. 304,808

3 Claims. (Cl. 267—9)

This invention relates to improvements in friction shock absorbing mechanisms, especially adapted for use as snubbing means for truck springs of railway cars.

One object of the invention is to provide a friction shock absorbing mechanism comprising a friction casing, friction shoes slidingly telescoped within the casing, a wedge in wedging engagement with the shoes, and spring means within the casing yieldingly resisting inward movement of the shoes, wherein the shoes have shouldered engagement with ledges or lugs on the casing to limit outward movement of the shoes, and the wedge is connected to the shoes by an anchoring element to limit outward movement of the shoes, whereby the anchoring element is relieved from strain as expansion of the mechanism is limited in release by direct shouldered engagement of the shoes with the casing.

Another object of the invention is to provide in a mechanism as set forth in the preceding paragraph, a certain amount of play in the anchoring connection of the wedge with the shoes, thereby greatly facilitating release of the mechanism.

Other objects of the invention will more clearly appear from the description and claims hereinafter following.

In the accompanying drawings forming a part of this specification, Figure 1 is a top plan view of my improved shock absorbing mechanism.

Figure 2 is a transverse vertical sectional view, corresponding substantially to the line 2—2 of Figure 1.

Figure 3 is a top plan view of the casing of my improved mechanism, partly broken away, and with one of the friction shoes in position within said casing.

Figures 5 and 6 are views similar to Figure 4, partly broken away, illustrating further stages of the assembling operation, Figure 6 showing in dotted lines a riveting support or anvil member employed in the assembling operation.

Figure 4:
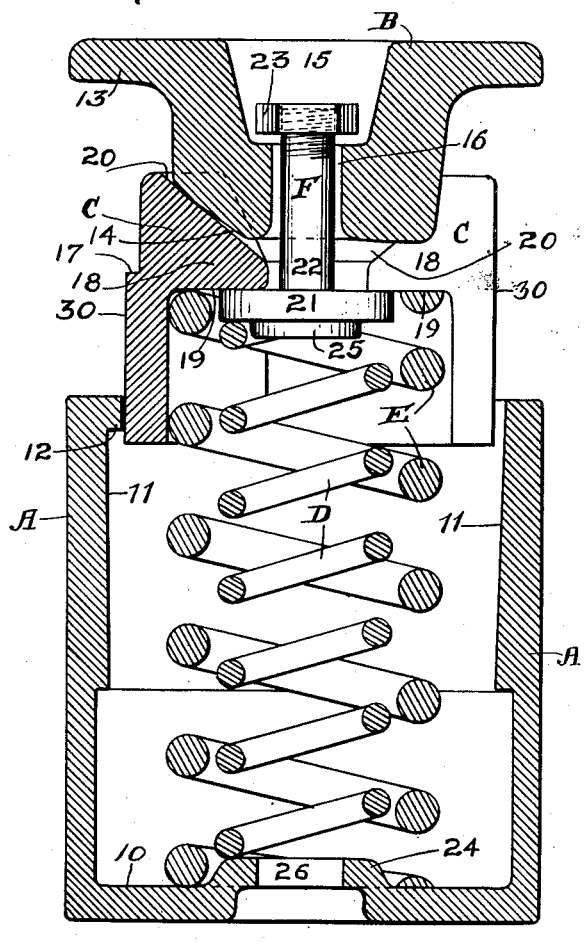
Figure 4 is a view similar to Figure 2, illustrating a stage of the operation of assembling the mechanism.

As shown in said drawings, my improved friction shock absorbing mechanism comprises broadly a friction casing A, a wedge B, three friction shoes C—C—C, inner and outer coil springs D and E, and a retaining element F.

The specific friction shock absorbing mechanism disclosed in the drawings, is of the type usually employed as a snubber in connection with truck springs of railway cars.

The casing A is of substantially hexagonal cross section, open at its upper end, and closed at its bottom end by a transverse wall 10. At the open end thereof, the casing presents three inwardly converging, interior friction surfaces 11—11—11 of V-shaped, transverse cross section, each surface 11 being formed by two adjacent walls of the hexagonal casing. At the open top end of the casing, at alternate corners, which are between the friction surfaces, are provided inturned stop webs or lugs 12—12—12 arranged for cooperation with the shoes C—C—C to limit outward movement of the latter.

The wedge B is in the form of a block, having an annular flange 13 at its outer end and three inwardly converging wedge faces 14—14—14 of V-shaped, transverse cross section at its inner end, arranged symmetrically about the longitudinal central axis of the mechanism. The outer end of the wedge block B presents a flat transverse abutment face adapted to receive the actuating force. The top portion of the wedge is cut out to provide an upwardly opening recess or seat 15, adapted to accommodate the nut of the retaining element F hereinafter described. The wedge B is also provided with a central longitudinal bore 16, which communicates with the recess 15 and is flared downwardly.

The friction shoes C—C—C are telescoped within the open end of the casing, each shoe having a longitudinally extending friction surface 30 of V-shaped, transverse cross section on its outer side, engaging the corresponding V-shaped friction surface 11 of the casing A. At the upper end, the outer corner of each shoe, that is, the corner thereof formed by the angle between the two portions of the V-shaped friction surface thereof, is cut away, as shown in the drawing, to provide a transverse stop shoulder 17, which is engaged beneath the corresponding lug 12 of the casing to limit outward movement of said shoe. Each shoe is laterally enlarged on its inner side at the upper end, as indicated at 18, and this enlargement presents a transverse abutment surface 19 at its inner end. On the inner side, the enlargement 18 of each shoe presents a wedge face 20 of V-shaped, transverse cross section, which is engaged by the V-shaped wedge face 14 at the corresponding side of the wedge B.

The retaining element F comprises a disclike spring follower member 21, an upstanding shank 22, extending from the center of the follower member and threaded at its upper end, and a nut 23 secured to said threaded end. The element F, as will be seen, is in effect a bolt member, the head of which is of relatively large size to provide the spring follower member 21. The retaining element F has the disclike spring follower member 21 thereof engaged with the underneath surfaces 19—19—19 of the shoes C—C—C and has the shank 22 extending through the bore 16 of the wedge B and into the recess 15 of said wedge. The nut 23 is engaged with the threaded upper end of the shank of the element F and secured against removal by upsetting the upper end of the shank, that is, riveting said end over the nut. In the full release position of the parts illustrated in Figure 2, there is a slight amount of clearance between the nut 23 and that portion of the bottom wall of the recess 15, which surrounds the bore 16 of the wedge B, thus allowing for the required movement of the shoes lengthwise with respect to the wedge, as the group of three shoes C—C—C is contracted during downward travel along the converging friction surfaces 11—11—11 of the casing A.

Each of the springs D and E is in the form of a helical coil, the spring E surrounding the spring D. The spring E has the top and bottom ends bearing respectively on the abutment surfaces 19—19—19 of the three shoes and the bottom end wall 10 of the casing A, the top end surrounding the disclike spring follower member 21 of the retainer element F and the lower end surrounding an inwardly projecting centering boss 24 on the bottom wall 10 of the casing A. The inner coil spring D has its top and bottom ends bearing, respectively, on the spring follower member 21 of the element F and the boss 24 at the bottom end of the casing. The spring D is held centered at its top end by a boss 25 formed on the follower member of the element F, extending into said spring. The boss 24 of the casing A is provided with an opening 26 therethrough for a purpose hereinafter pointed out.

Figure 5:
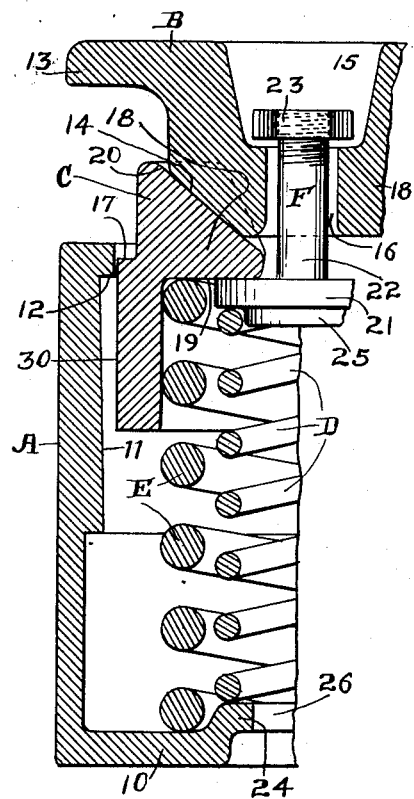

In assembling the mechanism, the casing A is placed in upright position, as illustrated in Figure 4. While in this position, the springs D and E are dropped into the casing and the assembled unit, comprising the shoes C—C—C, wedge B, and retaining element F, is placed within the upper end of the casing on top of the springs D and E. As shown in Figure 4, the wedge B and the shoes C—C—C of this unit are loosely joined by the retaining element F, the nut 23 not having been screwed home, a predetermined amount of clearance being thus left between the nut and the bottom wall of the recess 15 of the wedge B. Pressure is applied to the wedge B to force the same and the shoes C—C—C downwardly, beyond the positions shown in Figure 5, until the shoulders 17—17—17 on the shoes pass downwardly beyond the lugs 12—12—12 and, due to the spreading action exerted by the wedge on the shoes, snap under these lugs to connect the shoes to the casing for limited outward movement of said casing. The thus far assembled mechanism is then positioned on a riveting support or anvil 27, shown in dotted lines in Figure 6. As shown, the anvil 27 has a base portion 28 and an upstanding post member 29, the latter being engaged through the opening 26 of the casing A and the casing resting on said base portion 28. With the parts thus positioned, the mechanism is placed under full compression by forcing the wedge downwardly until the flange 13 thereof abuts the top of the casing, and the follower member 21 of the retaining element F rests on and is supported by the post 29 of the anvil 27, as shown in Figure 6. While the parts are thus held, the nut 23 is tightened by screwing the same downwardly until it is tightly clamped against the bottom wall of the recess 15 of the wedge B. After the nut has been thus tightened, the top end portion of the shank 22 of the element F is riveted over the nut 23 to secure the latter against accidental removal. By this procedure, sufficient looseness of the retaining element with respect to the edge and shoes, in the full expanded condition of the mechanism, is assured to permit the required amount of differential or advance movement of the shoes with respect to the wedge, at full compression of the mechanism, without placing the retaining element F under undue strain.

The operation of my improved shock absorbing mechanism is as follows: Upon downward movement of the wedge B with respect to the casing A being produced, the spring resisted shoes C—C—C are wedged apart and carried inwardly of the casing, compressing the springs D and E. High frictional resistance is thus provided between the friction surfaces of the shoes and casing. Upon the actuating force being reduced, the expansive action of the springs D and E returns all of the parts to the normal full release positions shown in Figure 2, outward movement of the shoes being abruptly arrested by engagement of the shoulders 17—17—17 of the latter with the lugs 12—12—12 of the casing, giving a snapping action to free the wedge B, which is loosely held by the retaining element F, from the wedging engagement with the shoes.

I claim:

1. In a friction shock absorbing mechanism, the combination with a friction casing open at one end and having inturned stop lugs at said open end; of friction shoes slidingly telescoped within the open end of said casing, said shoes having shoulders thereon engageable with said stop lugs to limit movement of said shoes outwardly of said casing; a wedge in wedging engagement with said shoes; a retaining element having shouldered engagement at opposite ends with said wedge and shoes for operatively connecting said wedge to said shoes; a spring in said casing bearing at opposite ends of said shoes and casing to yieldingly oppose inward movement of said shoes; and a second spring in said casing bearing at opposite ends on said casing and the inner end of said retaining element.

2. In a friction shock absorbing mechanism, the combination with a friction casing open at one end and having inturned stop lugs at said open end; of friction shoes slidingly telescoped within the open end of said casing, said shoes having shoulders thereon engageable with said stop lugs to limit movement of said shoes outwardly of said casing; a wedge in wedging engagement with said shoes; a retaining element having a head at its inner end in shouldered engagement with said shoes, and a nut at its outer end in shouldered engagement with said wedge for operatively connecting said wedge to said shoes; and springs within said casing yieldingly opposing inward movement of said shoes, one of said springs bearing on said head of the retaining element.

3. In a friction shock absorbing mechanism, the combination with a friction casing open at one end and having inturned stop lugs at said open end; of friction shoes slidingly telescoped within the open end of said casing, said shoes having shoulders thereon engageable with said stop lugs to limit movement of said shoes outwardly of said casing; a wedge in wedging engagement with said shoes; a retaining element having a spring follower at its inner end on which said shoes are seated, and a nut at its outer end in shouldered engagement with said wedge for operatively connecting said wedge to said shoes; and springs within said casing yieldingly opposing inward movement of said shoes, one of said springs bearing on said spring follower of the retaining element.

References Cited in the file of this patent

UNITED STATES PATENTS

| | | |
|---|---|---|
| 992,442 | O'Connor | May 16, 1911 |
| 1,256,297 | Courson | Feb. 12, 1918 |
| 1,303,288 | Geiger | May 13, 1919 |
| 1,741,649 | O'Connor | Dec. 31, 1929 |
| 2,524,893 | Dentler | Oct. 10, 1950 |
| 2,646,894 | Pierce | July 28, 1953 |